(12) United States Patent
Dehghan

(10) Patent No.: US 6,275,087 B1
(45) Date of Patent: Aug. 14, 2001

(54) ADAPTIVE CANCELLATION OF TIME VARIANT DC OFFSET

(75) Inventor: Hossein Dehghan, Danville, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/441,250

(22) Filed: Nov. 16, 1999

(51) Int. Cl.$^7$ ........................................................ H03L 5/00

(52) U.S. Cl. ............................................. 327/306; 327/307

(58) Field of Search ................................... 327/307, 362, 327/366, 310, 317, 306, 309

(56) References Cited

U.S. PATENT DOCUMENTS

| | | | | |
|---|---|---|---|---|
| 4,360,929 | * | 11/1982 | Isobe | 455/245 |
| 4,607,236 | * | 8/1986 | LeQueau | 331/17 |
| 6,038,262 | * | 3/2000 | Mestdagh | 357/285 |

* cited by examiner

*Primary Examiner*—Tuan T. Lam
*Assistant Examiner*—Hiep Nguyen

(57) ABSTRACT

A DC drift canceller circuit is disclosed. The circuit includes a decision device including an input and an output and a first adder configured to received the input and the output of the decision device. The first adder produces an error signal indicative of the difference between the input and output of the decision device. A noise filter of the circuit is configured to receive the error signal. A second adder of the circuit includes a first input coupled to the input of the canceller circuit and a second input coupled to the output of the noise filter such that the output of the second adder is substantially free of any DC drift component of the input signal. The output of the second adder is coupled to the input of the decision device. In one embodiment, the decision device comprises a slicer. In one embodiment, the noise filter comprises a low pass filter. The low pass filter may includes a first multiplier with an input configured to receive the error signal, a third adder circuit with a first input connected to the output of the first multiplier and a second input connected to the output of a delay circuit, and a second multiplier with an input connected to the output of the third adder and an output connected to the delay circuit. In another embodiment, the noise filter may comprise an integrator that includes a multiplier with an input configured to receive the error signal and a third adder circuit with a first input connected to the output of the multiplier and a second input connected to a delay circuit. The input of the delay circuit is connected to the output of the adder circuit and the output of the noise filter.

16 Claims, 4 Drawing Sheets

ADAPTIVE CANCELLATION OF TIME VARIANT DC OFFSET

BACKGROUND OF THE INVENTION

1. Field of the Invention

The present invention is related to the field of communication systems and more particularly to a method and circuit for mitigating static and/or dynamic DC offset or baseline wander at the transmitter, receiver, and/or in the channel.

2. History of the Related Art

Baseline wander is a well-known phenomenon observed in a wide variety of applications. Such applications may include, but are not limited to, any system that contains low frequency, random data signals, or uses transformer coupling, AC coupling, DC notching, and all systems suffering from DC drift and baseline wander at the transmitter, receiver, or in the communication channel itself. Applications that may experience such baseline wander may include wire line modem systems, digital subscriber line (DSl) and cable communication systems, Ethernet, radar, and television receivers. Typically, the principle methods of trying to compensate or eliminate baseline drift in a communication system include methods in which the received signal is observed over time to obtain an estimate of the DC offset or the DC droop by integrating the signal over time. This approach typically requires long term signal averaging that slows the response time and makes this type of approach difficult to implement in a system where the baseline wander changes rapidly. Only if the DC droop is significantly larger than the signal and is slowly changing over time would such an approach be appropriate. Otherwise, the droop estimate will be masked by the running sum of the inherently locally imbalanced signal samples. In other words, by integrating the signal over time, instantaneous signal information is lost and the sensitivity of the system to address rapidly changing baseline wander is limited. In another approach, an inverse filter is designed and used to directly cancel the effect of the channel and/or receiver component that causes the DC error. Unfortunately, this method requires knowledge of the drift source, its characteristics, and its invertability. Unfortunately, this information is not always readily available. For example, AC coupling transformers that are used in twisted pair applications typically have a zero at $s_z=0$ and hence their inversion requires a poll at $s_p=0$, which results in an unstable system. A third approach to addressing DC wander involves replicating the DC wander at the receiver by passing the detected data symbols through a filter whose frequency response is similar to that of the channel/receiver causing the DC error. This approach requires accurate knowledge of the drift causing channel and/or receiver component as well as reliable detection of transmitted symbols. Therefore, it would be highly desirable to implement a communication system incorporating the ability to cancel time varying DC offset that overcomes the described limitations of conventional approaches.

SUMMARY OF THE INVENTION

The problems identified above are in large part addressed by a DC drift canceller circuit with an input for receiving an input signal. The circuit includes a decision device including an input and an output and a first adder configured to receive the input and the output of the decision device. The first adder produces an error signal indicative of the difference between the input and output of the decision device. A noise filter of the circuit is configured to receive the error signal. A second adder of the circuit includes a first input coupled to the input of the canceller circuit and a second input coupled to the output of the noise filter such that the output of the second adder is substantially free of any DC drift component of the input signal. The output of the second adder is coupled to the input of the decision device. In one embodiment, the decision device comprises a slicer. In one embodiment, the noise filter comprises a low pass filter. The low pass filter may includes a first multiplier with an input configured to receive the error signal, a third adder circuit with a first input connected to the output of the first multiplier and a second input connected to the output of a delay circuit, and a second multiplier with an input connected to the output of the third adder and an output connected to the delay circuit. In another embodiment, the noise filter may comprise an integrator that includes a multiplier with an input configured to receive the error signal and a third adder circuit with a first input connected to the output of the multiplier and a second input connected to a delay circuit. The input of the delay circuit is connected to the output of the adder circuit and the output of the noise filter. The circuit may further include an analog to digital converter coupled between the input of the canceller circuit and the second adder or a digital to analog converter with an input connected to the output of the noise filter. In this embodiment, an output of the digital to analog converter is compared with the received signal at an input of the analog to digital converter.

The invention further contemplates a method of canceling DC drift in a received signal by generating a quantized signal responsive to the received signal. An error signal indicative of the difference between the received signal and the quantized signal is then generated. Noise from the error signal is then filtered to produce a filtered error signal that is used to modify the received signal. In one embodiment, the noise is filtered by integrating the error signal. Filtering noise from the error signal comprises filtering the error signal with a low pass filter. The method may further include converting the received signal from an analog signal to a digital signal prior to generating the quantized signal and converting the filtered error signal from a digital signal to an analog signal prior to using the filtered error signal to modify the received signal.

BRIEF DESCRIPTION OF THE DRAWINGS

Other objects and advantages of the invention will become apparent upon reading the following detailed description and upon reference to the accompanying drawings in which.

Figure 1:
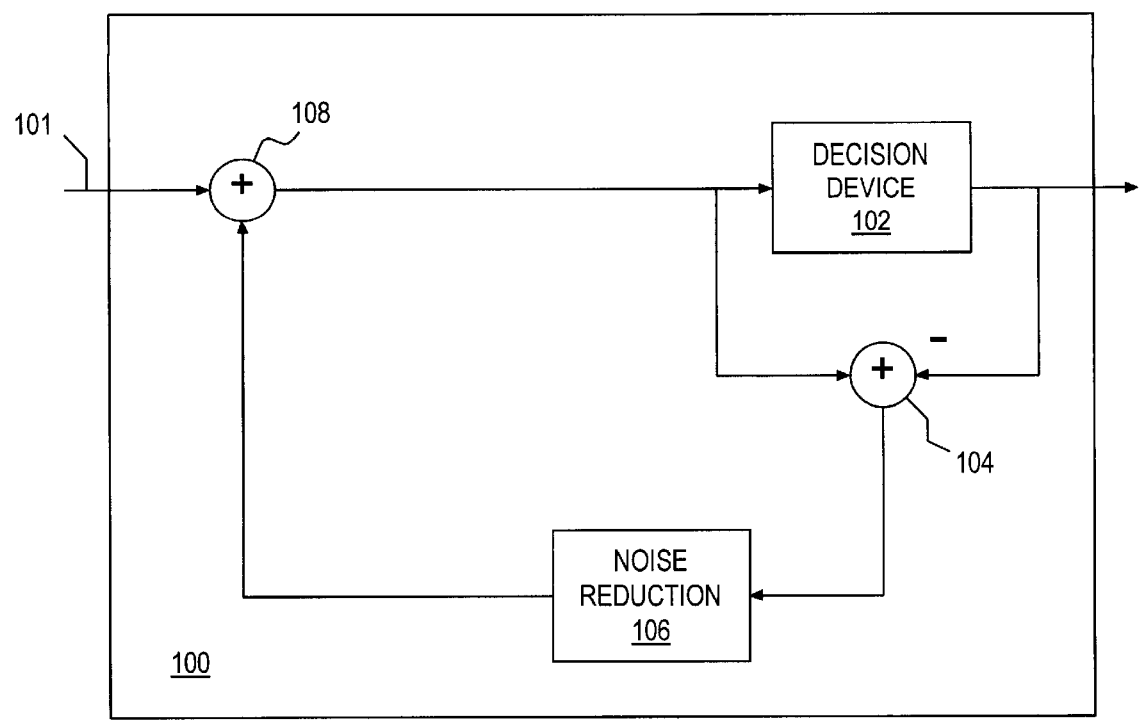
FIG. 1 is a diagram of a circuit according to one embodiment of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE DRAWINGS

Turning to FIG. 1, a simplified block diagram of a decision directed DC drift canceller circuit 100 is shown. In the embodiment depicted in FIG. 1, canceller circuit 100 includes a decision device 102, a first adder 104, a noise filter 106, and a second adder 108. The signal received at input 101 of circuit 100 is routed to the input of decision device 102, (ignoring for the moment the second adder circuit 108). Received signal 101 may include a DC drift component. If the DC drift component becomes excessive, the decision device 102 may interpret a received input incorrectly. In the preferred embodiment, decision device 102 is a slicer or quantizer that makes a decision about a received signal and produces a quantized output based upon that decision. As an example, decision device 102 may receive a signal of 1.1 and decide that the nearest allowed signal is 1.0 and produce an output of 1.0 based upon that decision. The first adder circuit 104 compares the inputs and outputs of decision device 102 to create an error signal indicative of the difference between the signal received by decision device 102 and the output of decision device 102. This error signal produced by adder circuit 104 will contain any DC drift component of the signal received by decision device 102. In addition, however, the error signal produced by first adder 104 will contain random noise that is generated by decision device 102. Thus, under the assumption that decision device 102 has not made an incorrect decision, the error signal generated by first adder 104 contains a DC drift component of the received signal in addition to any random noise generated by decision device 102. Noise filter 106 is designed to eliminate, to the extent possible, the effects of the random noise component of the error signal produced by first adder circuit 104. Ideally, noise filter 106 is suitable for removing randomly generated noise while minimizing the effects on remaining portions of a received signal. In the ideal embodiment, the output of noise filter 106 contains only the DC drift component of the error signal generated by first adder circuit 104. This DC drift component at the output of noise filter 106 is then subtracted from the input signal 101 at second adder circuit 108. In this manner, any DC drift component of the signal received at input 101 of canceller circuit 100 is removed at second adder circuit 108 such that the signal received by decision device 102 should be substantially free of any DC drift component. By eliminating the DC drift component from the signal by decision device 102, it will be appreciated that the decision device 102 should operate with a lower error rate. If the DC drift component of the signal received at input 101 of circuit 100 varies with time, the ongoing feedback mechanism provided by adder circuit 104 and noise filter 106 will continue to monitor the error signal to provide a time varying correction signal to second adder 108.

Figure 2:
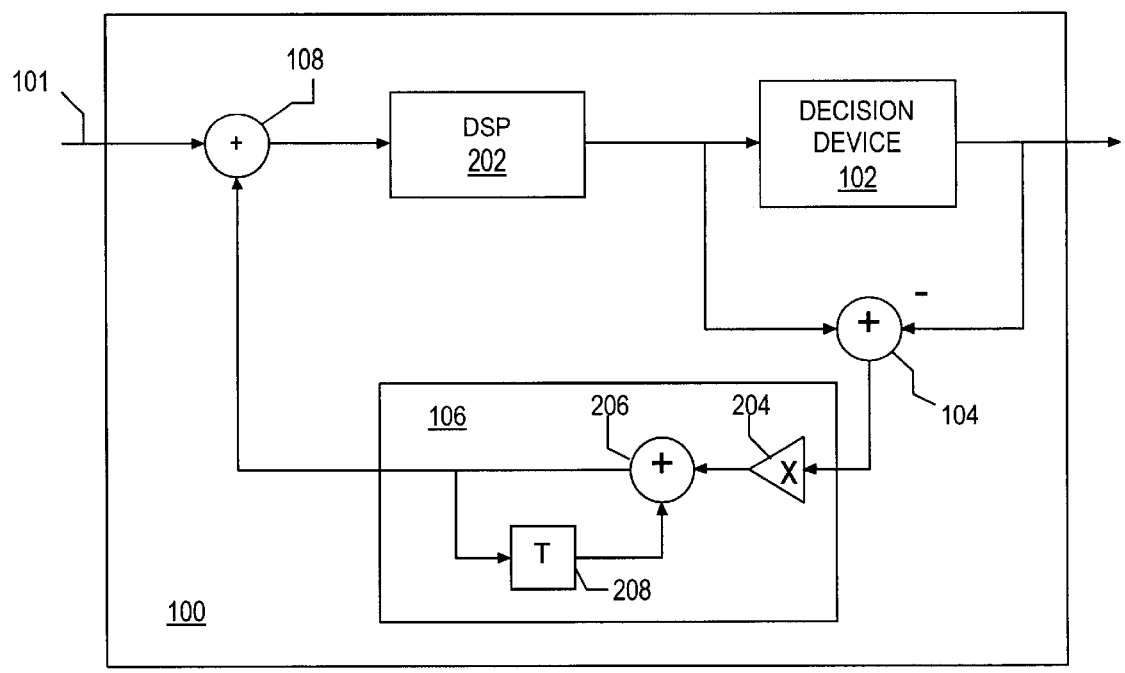
FIG. 2 is a diagram of the circuit of FIG. 1 including additional detail according to one embodiment of the invention.

Turning now to FIG. 2, an embodiment of circuit 100 shown in additional detail is presented. In the embodiment depicted in FIG. 2, a digital signal processor (DSP) 202 is included between first adder 108 and decision device 102. DSP 202 may perform any of a variety of functions typically designed to improve the quality of the received signal. In one embodiment, it is presumed that the effect DSP 202 on the DC drift component of the received signal is negligible. Thus, the output of DSP 202 that is received by decision device 102 is substantially the same, for purposes of this invention, as the signal received by decision device 102 in the embodiment depicted in FIG. 1. The error signal produced by first adder 104 is routed to noise filter 106. In the embodiment depicted in FIG. 2, noise filter 106 includes a multiplier 204, an adder 206, and a delay block indicated by reference numeral 208. Initially, the error signal generated by first adder 104 is passed through multiplier 204. Typically, the multiplication factor of multiplier 204 is less then unity to protect against a situation in which decision device 102 makes an incorrect decision that might otherwise create an unstable feedback condition. The output of multiplier 204 is connected to the third adder circuit 206. The output of adder circuit 206 is passed through digital time delay circuit 208 and fed back to adder circuit 206. The depicted embodiment of noise filter 106 represents an integrator designed to eliminate any random noise component from the error signal produced by first adder 104. By removing the random noise component from the received signal, noise filter 106 generates a drift signal at its output, that is an estimate of the baseline drift. By monitoring the error signal generated by first adder 104 using the integrator of the depicted embodiment of noise filter 106, an estimate of the baseline drift signal is produced at the output of noise filter 106. The baseline drift estimate is then subtracted from the incoming signal at second adder 108 to produce a truer representation of the original signal.

Under the assumptions that a) the decision device 102 is a noise source, b) no slicing errors are made at decision device 102, c) the frequency response of DSP 202 is unity for the frequency band of interest (i.e., at or near DC), and d) there are no non-linear devices such as analog to digital or digital to analog converters in the loop. The closed loop transfer function of circuit 100 is:

$$T(z)=[1+\mu \cdot H(z)]^{-1}.$$

Where $\mu$ is the loop gain parameter, which is determined by the multiplication factor introduced by multiplier 204. The choice of $\mu$ represents a tradeoff between DC drift tracking speed and tracking noise. A larger value for $\mu$ will result in greater DC drift tracking speed. If the random noise generated by decision device 102 is large enough, however, a large value for u may result in an over correction at second adder 108 that could result in an error by decision device 102. H(z) is the transfer function of the noise filter 106. If an integrator such as the integrator shown in FIG. 2 is used for noise filter 106, the overall closed group transfer function is:

$$T(z)=1/(1+\mu)\cdot(1-z^{-1})/[1-(1+\mu)^{-1}z^{-1}]$$

Figure 3:
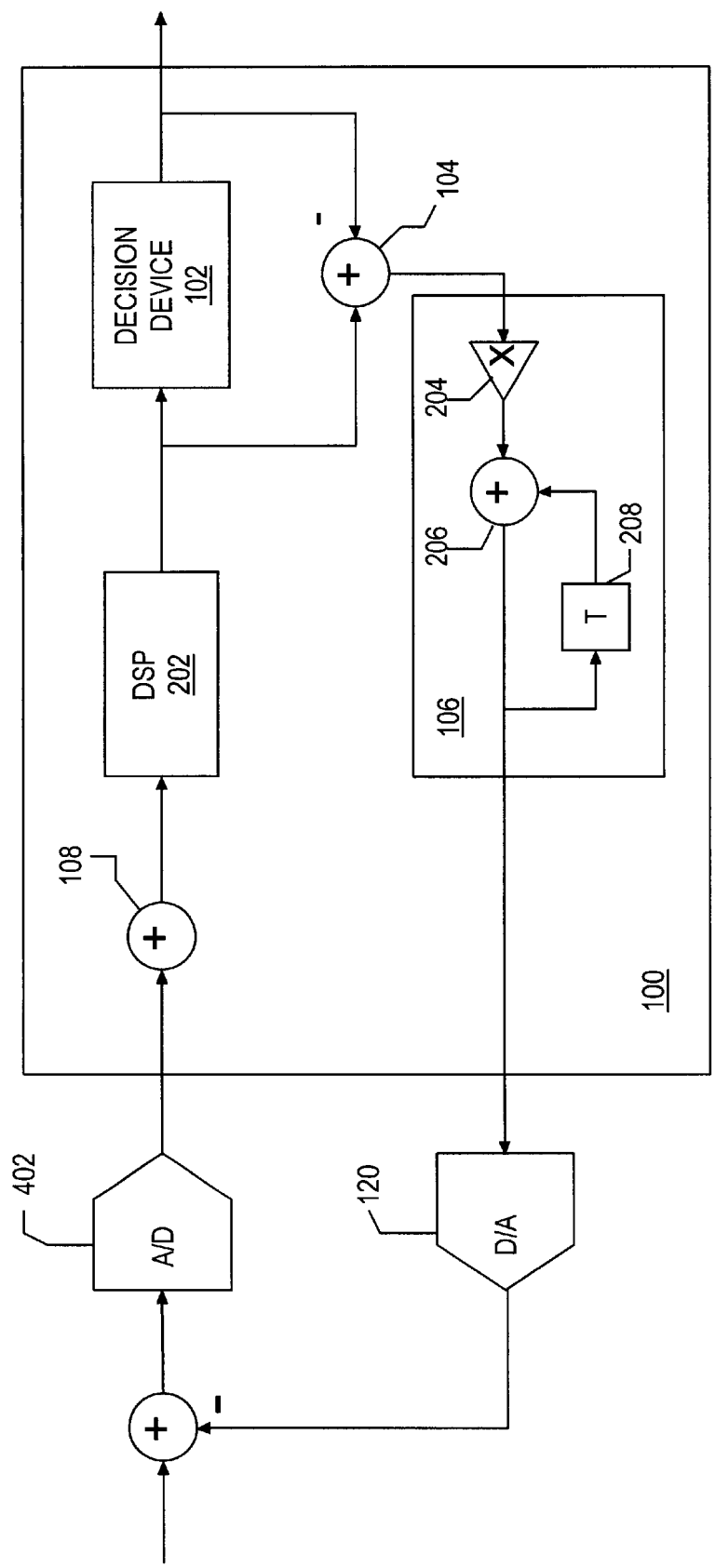
FIG. 3 is a diagram of the circuit of FIG. 1 including additional detail according to one embodiment of the invention.

Turning now to FIG. 3, an embodiment of circuit 100 is depicted in which the received signal is an analog signal that is routed through an analog to digital converter 402. In one embodiment, circuit 100 as shown in FIG. 3 may include a digital to analog to converter 120 that converts the estimate of the baseline drift at the output of noise filter 106 is passed through digital to analog converter 120 and is subtracted from the incoming analog signal as shown. In another embodiment, the output of noise filter 106 is directly subtracted from the digital signal produced at the output of analog to digital converter 402 at the second adder 108. Although the embodiment including digital to analog circuit 120 increases the cost of circuit 100, it will be appreciated by those skilled in the field having the benefit of this disclosure that the implementation that includes digital to analog converter 120 has a larger dynamic range than the implementation in which the input signal is initially provided to analog to digital converter 402. If the analog input signal varies outside the range of analog to digital converter 402, the digital output of analog to digital converter 402 will no longer reflect the incoming signal and the error signal generated at the output of adder 104 will not accurately reflect the error in the input signal. In another embodiment, noise filter 106 may comprise a low pass filter including a second multiplier. This second multiplier (not depicted in FIG. 2) multiplies the output of adder 206 and feeds the multiplied value back to time-delay circuit 208.

Figure 4:
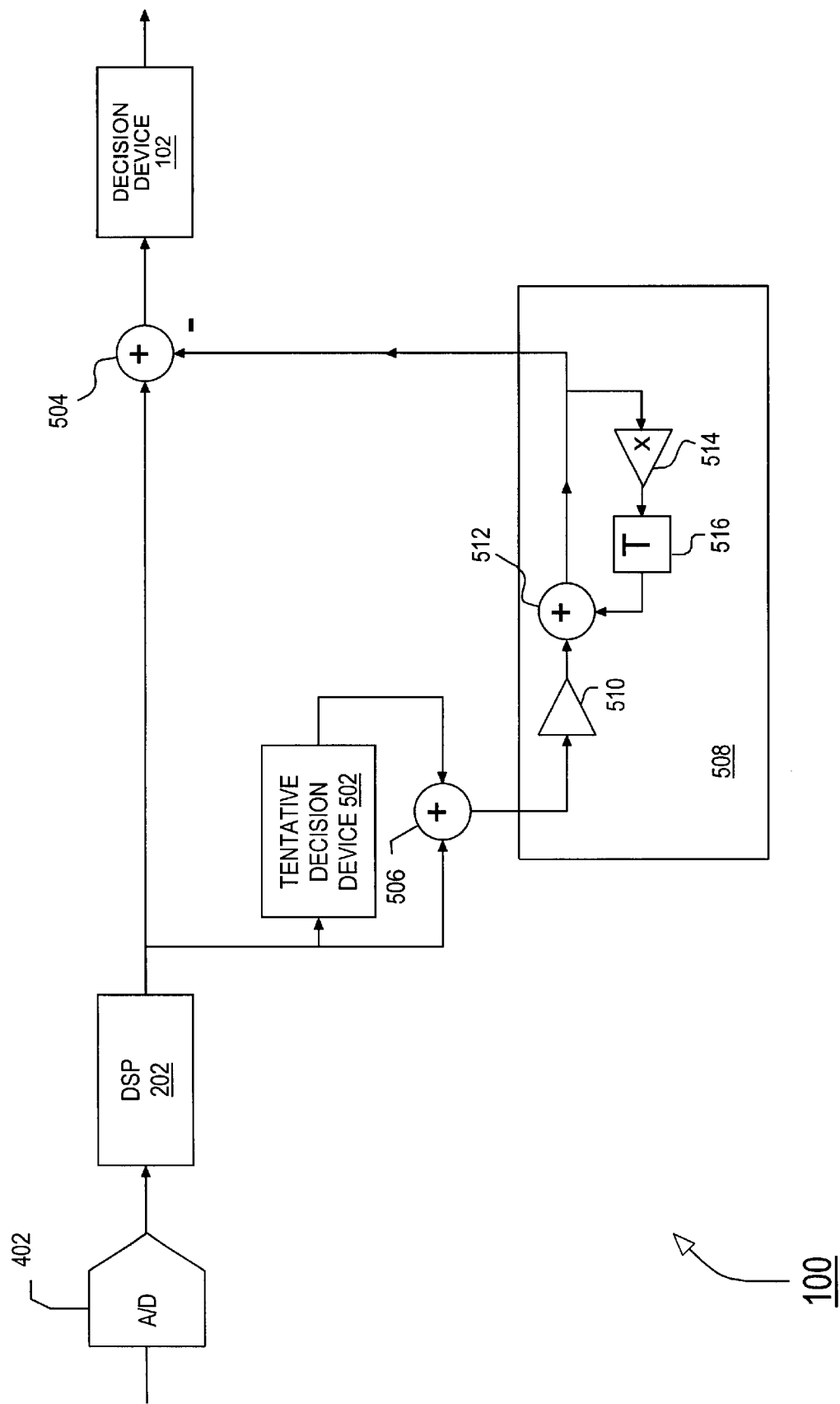
FIG. 4 is a diagram of a feed-forward implementation of one embodiment of the invention.

Turning now to FIG. 4, an embodiment of circuit 100 is indicated for a feed-forward implementation. In this embodiment, the output of analog to digital converter 402 is directly provided to DSP 202. The output of DSP 202 is connected to a second decision device 502 as well as to the inputs of a first adder 504 and a second adder 506. The output of tentative decision device 502 is also connected to second adder 506 to produce an error signal that is routed to a low pass filter circuit 508. As indicated, low pass circuit filter 508 includes a first multiplier 510 that receives the output of second adder 506. The output of multiplier 510 is provided to third adder 512. The output of third adder 512 is fed back to third adder 512 through a feedback group including a second multiplier circuit 514 in a time delay circuit 516. The output of low pass filter circuit 508 is subtracted from the digital representation of the incoming signal and first adder circuit 504. The output of first adder 504 is connected to the input of first decision device 102. In either the feed-forward implementation of FIG. 4 or the feedback implementations of FIGS. 1, 2, and 3, DC drift canceller circuit 100 as disclosed herein beneficially eliminates the need for a-priori information about the source of the DC drift. In addition, circuit 100 can accurately and quickly follow DC error whether it is static, slowly moving DC offset, or rapidly changing baseline wander. Because information about the source and characteristic of the DC drift is seldom available for non-conditioned transmission mediums, cancellation of baseline error is prohibitive and would be expensive using existing methods. Accordingly, it will be appreciated that canceller circuit 100 as disclosed herein enables transceiver systems to combat undesired channel defects and cancel DC offset and drift in a robust manner. The disclosed implementations require little additional computational complexity or hardware compared to alternative mechanisms that require costly channel estimation and cancellation or replication problems.

It will be apparent to those skilled in the art of failure analysis or deprocessing having the benefit of this disclosure that the present invention contemplates a device and method usefull in facilitating failure analysis of a semiconductor integrated circuit by simplifying the process of removing the heatspreader from an integrated circuit package. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A DC drift canceller circuit with an input for receiving an input signal, comprising:

a decision device including an input and an output;

a first adder configured to receive the input and the output of the decision device and to produce an error signal indicative of the difference between the input and output of the decision device;

a noise filter configured to receive the error signal;

a second adder with a first input coupled to the input of the canceller circuit and a second input coupled to the output of the noise filter, wherein the output of the second adder is coupled to the input of the decision device; and an analog to digital converter coupled between the canceller circuit input and the second adder.

2. The circuit of claim 1, wherein the decision device comprises a slicer.

3. The circuit of claim 1, wherein the noise filter comprises a low pass filter.

4. The circuit of claim 3, wherein the low pass filter includes:

a first multiplier with an input configured to receive the error signal;

a third adder circuit with a first input connected to the output of the first multiplier and a second input connected to the output of a delay circuit; and a second multiplier with an input connected to the output of the third adder and an output connected to the delay circuit.

5. The circuit of claim 1, wherein the noise filter comprises an integrator.

6. The circuit of claim 5, wherein the integrator includes:

a multiplier with an input configured to receive the error signal;

a third adder circuit with a first input connected to the output of the multiplier and a second input connected to a delay circuit;

wherein the input of the delay circuit is connected to the output of the adder circuit and the output of the noise filter.

7. The circuit of claim 1, further comprising a digital to analog converter with an input connected to the output of the noise filter, wherein an output of the digital to analog converter is compared with the received signal at an input of the digital to analog converter.

8. A DC drift canceller circuit configured to receive an input signal, comprising:

a decision device including an input and an output;

a first adder configured to receive the input and output of the decision device and further configured to produce an error signal indicative of the difference between the input and output of the decision device; and a low pass filter operable to remove noise from the error signal, wherein the low pass filter includes a first multiplier configured to receive the error signal, a second adder connected with an input connected to the output of the first multiplier, a second multiplier with an input connected to the output of the second adder; and a time delay circuit with an input connected to the output of the second multiplier and an output connected to the second adder such that the output of the second adder is indicative of the difference between the output of the first multiplier and the output of the time delay circuit; and wherein the output of the noise filter is subtracted from the input signal to eliminate DC drift from the input signal.

9. The circuit of claim 8, further comprising a digital signal processor (DSP) with an input and an output, wherein the DSP input is coupled to the received signal and the output is coupled to the decision device.

10. The circuit of claim 8, wherein the decision device comprises a slicer.

11. A DC drift canceller circuit configured to receive an input signal, comprising:

a decision device including an input and an output;

a first adder configured to receive the input and output of the decision device and further configured to produce an error signal indicative of the difference between the input and output of the decision device; and a noise filter including an integrator and configured to receive the error signal and operable to remove noise from the error signal;

wherein the output of the noise filter is subtracted from the input signal to eliminate DC drift from the input signal.

12. The circuit of claim 11, wherein the integrator comprises:

a multiplier configured to receive the error signal; and a second adder configured to receive the output of the multiplier and the output of a time delay circuit, wherein the output of the second adder is connected to the input of the second adder and to the output of the integrator.

13. A method of canceling DC drift in a received signal comprising:

generating a quantized signal responsive to the received signal;

generating an error signal indicative of the difference between the received signal and the quantized signal;

filtering noise from the error signal to produce a filtered error signal;

using the filtered error signal to modify the received signal; and converting the received signal from an analog signal to a digital signal prior to generating the quantized signal.

14. The method of claim 13, wherein filtering the noise comprises integrating the error signal.

15. The method of claim 13, wherein filtering noise from the error signal comprises filtering the error signal with a low pass filter.

16. The method of claim 13, further comprising converting the filtered error signal from a digital signal to an analog signal prior to using the filtered error signal to modify the received signal.

* * * * *